United States Patent
Matsuzaki et al.

(10) Patent No.: US 9,440,793 B2
(45) Date of Patent: Sep. 13, 2016

(54) CONVEYOR DEVICE FOR CONVEYING FOOD

(71) Applicant: MAYEKAWA MFG. CO., LTD., Tokyo (JP)

(72) Inventors: Tomohiko Matsuzaki, Tokyo (JP); Kou Ishikura, Tokyo (JP); Takayuki Sekita, Tokyo (JP); Takeshi Chimura, Tokyo (JP); Takayuki Kishi, Tokyo (JP); Akira Sekino, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 14/758,062

(22) PCT Filed: Dec. 19, 2013

(86) PCT No.: PCT/JP2013/084128
§ 371 (c)(1),
(2) Date: Jun. 26, 2015

(87) PCT Pub. No.: WO2014/103886
PCT Pub. Date: Jul. 3, 2014

(65) Prior Publication Data
US 2016/0194154 A1 Jul. 7, 2016

(30) Foreign Application Priority Data

Dec. 27, 2012 (JP) ................................. 2012-286311
Dec. 27, 2012 (JP) ................................. 2012-286313

(51) Int. Cl.
*B65G 15/02* (2006.01)
*B65G 21/18* (2006.01)
(Continued)

(52) U.S. Cl.
CPC .............. *B65G 21/18* (2013.01); *A23L 3/361* (2013.01); *B65G 17/063* (2013.01); *B65G 17/086* (2013.01); *B65G 23/06* (2013.01); *A23V 2002/00* (2013.01)

(58) Field of Classification Search
CPC ............................ B65G 15/02; B65G 17/083

USPC ................................ 198/778, 834, 848, 850
See application file for complete search history.

(56) References Cited

U.S. PATENT DOCUMENTS 3,809,207 A  5/1974 Euverard
3,938,651 A * 2/1976 Alfred ..................... A23L 3/001
                                                              198/778

(Continued)

FOREIGN PATENT DOCUMENTS

JP        03216409 A   9/1991
JP        3005224 U   10/1994
(Continued)

OTHER PUBLICATIONS

Japanese Office Action issued in counterpart application No. JP2014554386, dated Dec. 18, 2015. English translation provided.
(Continued)

*Primary Examiner* — Douglas Hess
(74) *Attorney, Agent, or Firm* — Rossi, Kimms & McDowell LLP

(57) ABSTRACT

To prevent the production of metal powder in a conveyor device for conveying food (12), and prevent the contact pressure and wearing from increasing at the slide portion between a conveyor belt (15a, 15b, 15c and 15d) and a guide rail (82) in a low temperature environment. A conveyor device for conveying food includes a large number of round bars (60) which forms the conveyor belt (15a, 15b, 15c and 15d), coupling members (62) which are fixed to both ends of each of the round bars (60), a guide rail (82) which slidably supports the conveyor belt (15a, 15b, 15c and 15d), and a slide block (78) fixed to each round bar (60) and configured to slide on the guide rail (82). The coupling members (62) includes rotatable rollers (74), the rollers (74) mesh with a sprocket (48, 50), and the sprocket (48, 50) conveys the conveyor belt (15a, 15b, 15c and 15d) in a conveyance direction. The rollers (74) and the meshing portion of the sprocket (48, 50) include a wear resistant resin member.

9 Claims, 11 Drawing Sheets

(51) Int. Cl.
  *B65G 17/06* (2006.01)
  *B65G 17/08* (2006.01)
  *B65G 23/06* (2006.01)
  *A23L 3/36* (2006.01)

(56) References Cited

U.S. PATENT DOCUMENTS

| | | | | |
|---|---|---|---|---|
| 5,228,557 | A * | 7/1993 | Lago | B65G 21/18 |
| | | | | 198/778 |
| 5,501,319 | A * | 3/1996 | Larson | B65G 17/064 |
| | | | | 198/778 |
| 6,202,834 | B1 | 3/2001 | Layne et al. | |
| 7,494,005 | B2 * | 2/2009 | Messick, Jr. | B65G 17/064 |
| | | | | 198/848 |
| 7,762,388 | B2 * | 7/2010 | Lago | B65G 17/063 |
| | | | | 198/778 |
| 8,302,765 | B2 * | 11/2012 | Lago | B65G 17/064 |
| | | | | 198/778 |
| 9,061,829 | B2 * | 6/2015 | Salsone | B65G 15/30 |
| 2008/0017483 | A1 * | 1/2008 | Lago | |
| 2010/0282577 | A1 * | 11/2010 | Rettore et al. | |
| 2011/0284347 | A1 | 11/2011 | Maclachlan et al. | |

FOREIGN PATENT DOCUMENTS

| | | |
|---|---|---|
| JP | 3005224 U | 12/1994 |
| JP | 10157820 A | 6/1998 |
| JP | 200250243 A | 2/2002 |
| JP | 3123226 U | 6/2006 |
| JP | 3123226 U | 7/2006 |
| JP | 2007-169059 A | 7/2007 |
| JP | 2007169059 A | 7/2007 |
| JP | 2008-56489 A | 3/2008 |
| JP | 2012-515124 | 7/2012 |

OTHER PUBLICATIONS

International Search Report issued in PCT/JP2013/084128 dated Apr. 8, 2014. English translation provided.
Written Opinion issued in PCT/JP2013/084128 Form PCT/ISA/237, dated Apr. 8, 2014.
International Preliminary Report issued in PCT/JP2013/084128 Form PCT/IB/338 and PCT/IB/373, dated Jul. 9, 2015.

* cited by examiner

CONVEYOR DEVICE FOR CONVEYING FOOD

TECHNICAL FIELD

The present invention relates to a conveyor device for conveying food which can be applied to food processing in a closed space and more particularly can be applied to processing such as cooling, freezing, heating, and drying.

BACKGROUND

Conventionally, a configuration has been employed in which a spiral endless conveyor is disposed in a freezer and freezing processing is executed on food and the like being conveyed by the spiral endless conveyor, as a configuration of executing processing such as heating, drying, and freezing on food. The spiral endless conveyor provides an advantage of achieving a smaller conveyor installation area and achieving labor saving by reducing an operation of putting and taking a product to be frozen into and out of the freezer. Patent Document 1 discloses an example of such a conveyor device which is schematically described below with reference to FIG. 14.

In FIG. 14, a spiral endless conveyor device 100 has a spiral endless conveyor belt 104 disposed in a vertical direction in an area surrounded by a plurality of columns 102. An electric motor 106 is disposed in an area around an inlet of the spiral endless conveyor 104 and an auxiliary transmission device 108 is disposed in an interior area of the spiral endless conveyor belt 104. The electric motor 106 drivingly rotates the auxiliary transmission device 108 via a gear 110. A plurality of columns 112, forming the auxiliary transmission device 108, rotate to apply moving force to the spiral endless conveyor belt 104.

The spiral endless conveyor belt 104 includes an inlet path 104A, a spiral ascending path 104B disposed in an interior area of the columns 102, a turning back path 104C disposed at the upper most portion, a spiral descending path 104D, and an outlet path 104E. The upper most portion of the spiral ascending path 104B is connected to the upper most portion of the spiral descending path 104D via the turning back path 104C. The turning back path 104C does not involve reversing of the conveyance surface, and turns back with the same conveyance surface always facing upward. The spiral ascending path 104B and the spiral descending path 104D are alternately arranged in the vertical direction and move in opposite directions.

Patent Document 2 and Patent Document 3 disclose a configuration of a conveyor belt forming a conveyor device. In FIG. 6 in Patent Document 2, a configuration is disclosed which includes tooth-shaped portions, of an involute form, arranged at an equal interval at an outer side portion of the conveyor belt and a toothed wheel which meshes with the tooth-shaped portions, and which drives the conveyor belt with the toothed wheel.

Patent Document 3 discloses a configuration in which supported portions, with a U-shaped cross section opening in the horizontal direction, are disposed at both side portions of the conveyor belt and a guide rail loosely fitted to the supported portions is provided, and the guide rail movably supports the conveyor belt. Patent Document 2 and 3 disclose a configuration in which an anti-drop plate, which prevents a conveyed product from dropping, protrudes upward from a conveyor belt conveyance surface and is fixedly fitted to two adjacent bars forming the conveyor belt.

CITATION LIST

Patent Literature

Patent Document 1: Japanese Patent Application Laid-open No. 2007-169059
Patent Document 2: Japanese Patent Application Laid-open No. 2008-56489 (FIG. 6)
Patent Document 3: Japanese Utility Model No. 3123226

SUMMARY

Technical Problem

Generally, the tooth-shaped portions and the tooth-wheel which meshes with the tooth-shaped portions, disclosed in Patent Document 2, are formed of metal such as stainless steel. Thus, metal powder, produced by friction at the meshing portion, might adversely affect the quality of a conveyed product such as food. The supported portions having the U-shaped cross section disclosed in Patent Document 3 have the following problems. Specifically, in a low temperature environment such as a freezer, the rail might protrude inward from each of the supported portions due to the difference between a material of the supported portion and a material of the rail supporting the supported portion in a linear expansion coefficient.

Furthermore, there is a problem that driving torque increases due to high contact pressure between the supported portion and the guide rail attributable to the difference between the supported portion and the guide rail in the linear expansion coefficient and wearing of a slide surface between the supported portion and the guide rail increases. Furthermore, there is a problem that, because the guide rail is inserted in the supported portion having the U-shaped cross section, it is difficult to remove slackening of the conveyor belt.

The anti-drop plate disclosed in Patent Documents 2 and 3 is a single anti-drop plate fixedly fitted to the two bars forming the conveyor belt. Thus, the relative position between the adjacent bars is restricted. As a result, there is a problem that an intricate curved line shape of the conveyor belt cannot be formed at a curved portion of the conveyor belt. Furthermore, there is a problem that the anti-drop plate has fixedly fitted portions for the two bars formed, and thus has a complicated structure and requires a high manufacturing cost.

Thus, in view of the problems of the conventional techniques, an object of the present invention is to prevent the production of the metal powder, and prevent the contact pressure and wearing from increasing at the slide portion between the conveyor belt and the guide rail in the low temperature environment. A furthermore object is to enable the slackening of the conveyor belt to be easily fixed, achieve higher design freedom of the conveyor belt by enabling the intricate curved line shape to be formed at the curved portion of the conveyor belt, and simplify the structure of the anti-drop material.

Solution to Problem

The present invention is applied to a conveyor device for conveying food which processes food while conveying the food with a spiral conveyor belt disposed in a vertical direction in a closed space and includes a large number of bar members which are arranged in parallel to form the conveyor belt, coupling members which are fixed to both ends of each of the bar members and couple the bar members with each other, a guide rail which slidably supports the conveyor belt including the bar members, and a sprocket which meshes with tooth-shaped portions formed on the coupling members.

To achieve the objects, the conveyor device for conveying food according to the present invention includes a slide block fixed to a portion of each bar member at an inner side of one of the coupling members and configured to slide on the guide rail disposed along the conveyor belt, and rollers which form the tooth-shaped portions and mesh with the sprocket, the rollers being rotatably supported by shafts disposed on the coupling members in a direction intersecting with a conveyance surface of the conveyor belt. In addition, the rollers each include a wear resistant resin member, and a meshing portion of the sprocket which meshes with the rollers includes a wear resistant resin member.

In this configuration, the guide rail supports the conveyor belt from below via the slide blocks. The sprocket applies driving force to move the coupling members in a conveyance direction, the slide block slides on the guide rail while being supported by the guide rail, and the conveyor belt moves in the conveyance direction.

In the present invention, the rollers can rotate in a rotation direction of the sprocket, whereby slipping between the roller and the sprocket can be reduced. The roller and the meshing portion of the sprocket include wear resistant resin, whereby wearing at the meshing portion can be reduced. Thus, the quality of the food can be prevented from being adversely affected.

The wear resistant resin used in the present invention is, for example, what is known as engineering plastic such as ultrahigh molecular polycarbonate (PC), polyamide (PA), and polyether ether ketone (PEEK), fluorocarbon resin such as Teflon (registered trademark), nylon resin, or the like.

The slide block has the slide surface which slides on the guide rail and does not surround the rail, as in the case of the supported portion in Patent Document 3. Thus, the slackening of the conveyor belt can be easily fixed, and the contact pressure and the wearing between the slide block and the guide rail do not increase in the low temperature environment. The slide block is provided for each bar member, and thus the movement of the adjacent bar members is not restricted by the slide block at a curved portion of the conveyor belt. Thus, the bar member can form an intricate curved line shape at the curved portion of the conveyor belt, and thus higher design freedom of the conveyor belt can be achieved. Furthermore, the slide block can have a simple shape and can be manufactured at a low cost.

In one aspect of the present invention, each coupling member has a bent shape with an interior space, has both end portions coupled to a first bar member, and has a pair of slotted holes in which a second bar member which is adjacent to the first bar member is loosely fitted.

Thus, the conveyor belt can be formed with the coupling members provided at both ends of each bar member restricting the two adjacent bar members. On the other hand, the coupling members are restricted in series along the conveyance path via the bar members. The bar member loosely fitted in the slotted holes of the coupling members can move in the conveyance direction in the slotted holes. Thus, relative displacement between the bar members in the conveyance direction can be adjusted. Curving of the conveyor belt can be achieved by changing the interval between both ends of the bar members.

In one aspect of the present invention, each slide block includes: a slide surface which is in slidable contact with the guide rail, and a guide portion which protrudes towards the guide rail from the slide surface and has a guide surface guided by a side surface of the guide rail, and the guide rail supports the spiral conveyor belt from below via the slide surfaces of the slide blocks, and guides the spiral conveyor belt via the guide portions of the slide blocks.

Thus, the conveyor belt can be prevented from falling off from the guide rail with a simple configuration of providing the guide portion.

In one aspect of the present invention, the slide surfaces and the guide surfaces of the slide blocks are each formed of a wear resistant resin, an upper edge of the guide rail is covered with a cover made of a wear resistant resin, and the cover made of the wear resistant resin is in slidable contact with the slide surfaces and the guide surfaces of the slide blocks.

Thus, wearing of the slide surface between the slide block and the guide rail as well as the production of abrasion powder can be prevented, whereby influence on the quality of the food on the conveyor belt can be eliminated.

In one aspect of the present invention, the slide surface of each slide block includes a pair of slide surfaces which are disposed to be vertically symmetrical with respect to the bar members, and the guide surface of each guide portion includes a pair of guide surfaces which are disposed to be vertically symmetrical with respect to the bar members.

With the slide surfaces and the guide surfaces disposed on upper and lower sides of the bar member as described above, the conveyor belt can be guided by the guide rail even when the conveyor belt is reversed to be upside down, whereby the conveyor belt can be stably supported.

In one aspect of the present invention, the spiral conveyor belt includes an endless conveyor belt including a return path in which the spiral conveyor belt is reversed at a terminating end of the spiral conveyor belt to return to a starting end of the spiral conveyor belt, and the guide rail is disposed over an entire length of the endless conveyor belt. The conveyor device includes a tension adjustment mechanism which is disposed in a path of the endless conveyor belt and adjusts tension of the endless conveyor belt. The conveyor device also includes a conveyance mechanism including the sprocket and a driving device for the sprocket.

When the contact pressure and the friction force between the guide portion and the guide rail increase, a knocking phenomenon involving unstable conveyance speed due to periodical change of the contact pressure and the friction force occurs. Thus, the smooth movement of the conveyor belt is hindered.

In this aspect, the tension adjustment mechanism can adjust the slackening of the endless conveyor belt, whereby the knocking phenomenon can be prevented from occurring.

In the return path, the conveyor belt is supported by the guide rail and thus can be prevented from slackening.

In one aspect of the present invention, the endless conveyor belt includes: an inlet path which is disposed in a horizontal direction, a spiral ascending path which has a lower end portion coupled to the inlet path and spirally ascends towards a downstream side in a conveyance direction, a turning back path turning back from an upper most portion of the spiral ascending path, a spiral descending path coupled to the turning back path and disposed so that stages of the spiral ascending path and stages of the spiral descending path are arranged alternately, the spiral descending path spirally descending, an outlet path which is coupled to a lower most portion of the spiral descending path and is disposed in the horizontal direction, and the return path which turns back at an end of the outlet path toward a lower part of the outlet path and continues to an end of the inlet path.

The spiral ascending path and the spiral descending path are disposed so that stages of the spiral ascending path and stages of the spiral descending path are arranged alternately as described above. Thus, the space saving can be achieved. Furthermore, the food is put in and taken out from a lower portion, whereby the food can be easily placed on and taken off from the spiral conveyor belt. Thus, labor saving and higher efficiency can be achieved.

In one aspect of the present invention, the conveyor device also includes a blocking plate which is partially suspended from the guide rail so as to extend in the conveyance direction and disposed on an inner side of the guide portions. The blocking plate can prevent the food on the conveyor belt from falling off. The blocking plate is suspended from the guide rail and thus can be easily attached.

In one aspect of the present invention, the conveyor device also includes columns which stand on both sides of the spiral endless conveyor belt, and a supporting structure including: a plurality of arms each of which is connected to a portion of the guide rail at an identical phase, the plurality of arms being arranged in the vertical direction, and a base portion which is integrally formed with the plurality of arms and is fixed to each of the columns.

Thus, the guide rail having multiple stages can be supported by a single supporting structure, whereby a simple and low cost supporting unit for the guide rail can be achieved.

Advantageous Effects

In the present invention, the roller and the sprocket which mesh each other are made of wear resistant resin, and thus metal powder can be prevented from being produced, and the quality of a conveyed product can be prevented from degrading.

The conveyor belt is in slidable contact via the slide block which slides on the guide rail. Thus, contact pressure and wearing of the slide portion between the conveyor belt and the guide rail can be prevented from increasing and the slackening of the conveyor belt can be easily fixed in a low temperature environment such as a freezer.

DETAILED DESCRIPTION

Embodiments of the present invention shown in the accompanying drawings will now be described in detail. It is intended, however, that dimensions, materials, shapes, relative positions, and the like of components described in the embodiments shall be interpreted as illustrative only and not limitative of the scope of the present invention unless otherwise specified.

Embodiment 1

Figure 1:
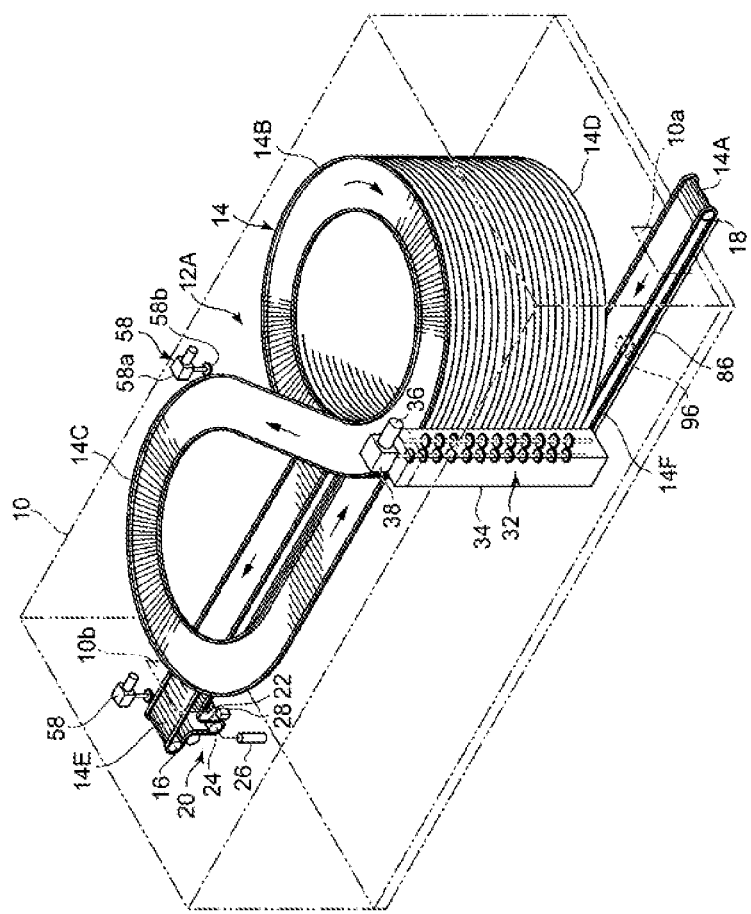
FIG. 1 is a perspective view of an entire conveyor device according to a first embodiment of the present invention.

A conveyor device for conveying food according to a first embodiment of the present invention will be described with reference to FIG. 1 to FIG. 11. In FIG. 1, a freezer 10 having a closed structure excluding an inlet opening 10a and an outlet opening 10b is disposed, and a conveyor device 12A is disposed in the freezer 10.

An endless conveyor path 14 disposed in a spiral endless conveyor device 12 includes: an inlet path 14A which enters into the freezer 10 through the inlet opening 10a; a spiral ascending path 14B spirally ascending from the inlet path 14A; a turning back path 14C turning back from the upper most portion of the spiral ascending path 14B; a spiral descending path 14D disposed so that stages of the spiral ascending path 14B and stages of the spiral descending path 14D are arranged alternately, the spiral descending path spirally descending from the turning back path 14C; an outlet path 14E extending from the lower most stage of the spiral descending path 14D to the outside of the freezer 10 through an outlet opening 10b; and a return path 14F which is reversed at an end of the outlet path 14E with a guide sprocket 16, and then is reversed again with a guide roller 18 to continue to the inlet path 14A. The spiral ascending path 14B and the spiral descending path 14D move in opposite directions. The turning back path 14C turns back with the same conveyance surface always facing upward.

Figure 2:
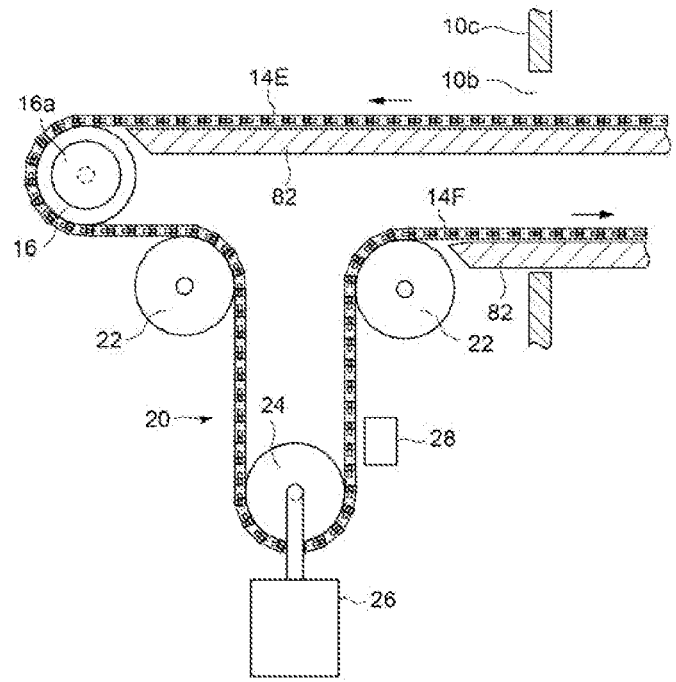
FIG. 2 is a front view showing an outlet portion of the conveyor device.

As shown in FIG. 2, a drive motor 16a is provided in the guide sprocket 16. A tension adjustment mechanism 20 for the endless conveyor path 14 is disposed on an outer side of a side wall 10c of the freezer 10 on which the outlet opening 10b is formed. The tension adjustment mechanism 20 includes a pair of guide sprockets 22 and 22 and a tension roller 24 which face the return path 14F. The tension roller 24 can be moved in a vertical direction by a tension weight 26. The tension of the endless conveyor path 14 is adjusted by the movement of the tension roller 24. A tension detection sensor 28 which detects the tension of the return path 14F is disposed at an outlet side portion of the tension roller 24.

For example, the tension detection sensor 28 may be a contactless sensor or may employ a system of detecting counterforce acting on the tension roller 24 and calculating the tension of the return path 14F from the detected value. The detected value from the tension detection sensor 28 is input to a control device 30 (refer to FIG. 11).

Figure 3:
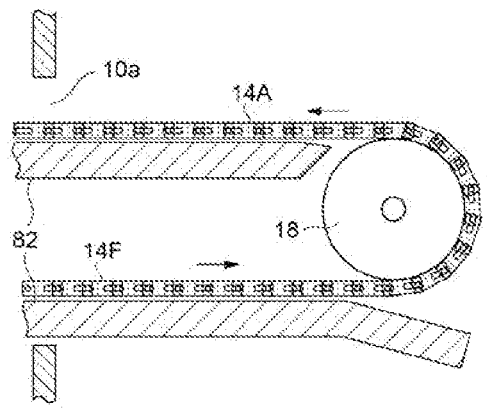
FIG. 3 is a front view showing an inlet portion of the conveyor device.

FIG. 3 shows the inlet path 14A protruding outside from the freezer 10 through the inlet opening 10a. An operator places food on the conveyor belt at the inlet path 14A.

A conveyance mechanism 32, which is disposed adjacent to a spiral portion of the endless conveyor path 14 and moves the conveyor belt in a conveyance direction, and a housing 34, which is vertically long and incorporates the conveyance mechanism 32, stand in the freezer 10. A configuration of the conveyance mechanism 32 will be described with reference to FIG. 4.

Figure 4:
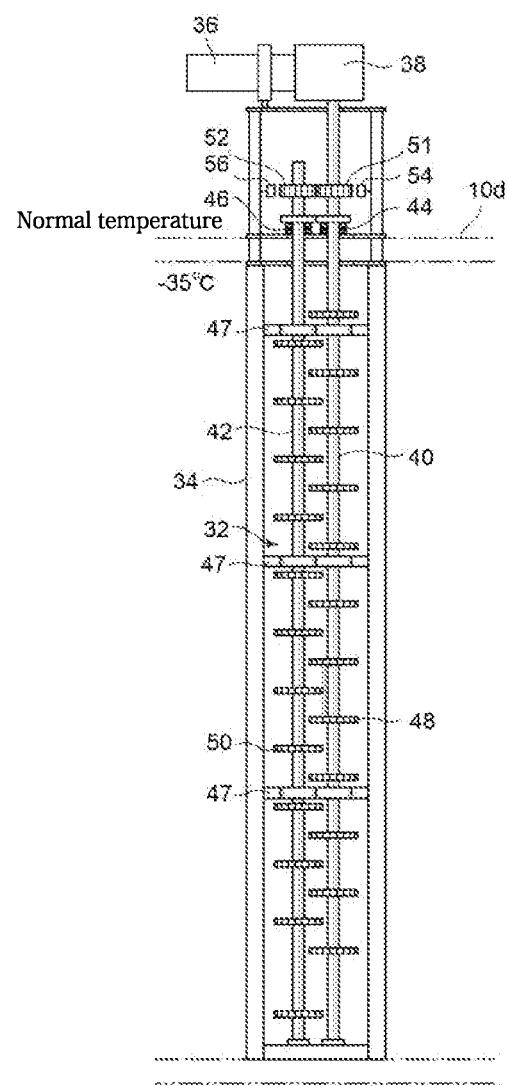
FIG. 4 is a front view of a conveyance mechanism of the conveyor device.

In FIG. 4, an upper portion of the housing 34 is disposed through a ceiling wall 10d of the freezer 10 to protrude outside from the freezer 10. A drive motor 36 and a decelerator 38 are disposed on a top surface of the housing 34. Two rotational axes 40 and 42 are disposed in parallel in the vertical direction in the housing 34. The rotational axes 40 and 42 are supported in the vertical direction by thrust bearings 44 and 46 supported on the ceiling wall 10d in a normal temperature area outside the freezer 10. The rotational axes 40 and 42 have a position in the horizontal direction fixed by a plurality of intermediate bearings 47 arranged in the vertical direction and fixed to the housing 34. A plurality of sprockets 48 and 50 are respectively attached to the rotational axes 40 and 42 at positions corresponding to heights of the inlet path 14A, the spiral ascending path 14B, the spiral descending path 14D, the outlet path 14E, and the return path 14F. By disposing the thrust bearings 44 and 46 in the normal temperature area outside the freezer 10, much longer service lives of the thrust bearings 44 and 46 can be achieved.

The sprockets 48 and 50 are each formed of the above-described wear resistant resin member, mesh with rollers 74 of later-described coupling members 62 forming the conveyance path, and move the endless conveyor path 14 in the conveyance direction. Spur gears 51 and 52 are fixed to upper portions of the rotational axes 40 and 42. Teeth counting sensors 54 and 56, which measure the number of teeth of the spur gears 51 and 52 passing through, are disposed at positions, in the housing 34, facing the spur gears 51 and 52. The rotational axes 40 and 42 are rotated in opposite directions by the drive motor 36 with the spur gears 51 and 52 meshing each other. The sprockets 48 mesh with the rollers 74 in the inlet path 14A and the spiral ascending path 14B. The sprockets 50 mesh with the rollers 74 in the spiral descending path 14D and the return path 14F. The inlet path 14A and the return path 14F as well as the spiral ascending path 14B and the spiral descending path 14D move in opposite directions.

Tension adjustment devices 58, each including a torque motor 58a and a sprocket 58b, are disposed at outlet ends of the turning back path 14C and the outlet path 14E. The tension adjustment devices 58 each rotate the sprocket 58b at a speed slightly faster than the movement speed of the endless conveyor path 14. Thus, the slackening of the endless conveyor path 14 at the installed portions can be fixed.

FIG. 5 to FIG. 8 each show a part of the spiral conveyance path including the spiral ascending path 14B and the spiral descending path 14D and show four spiral conveyor belts 15a, 15b, 15c and 15d disposed in the vertical direction. Of the four spiral conveyor belts, the spiral conveyor belts 15a and 15c form a part of the spiral ascending path 14B, and the spiral conveyor belts 15b and 15d form a part of the spiral descending path 14D. The spiral conveyor belts 15a to 15d include a large number of round bars 60 disposed in a horizontal direction.

Figure 6:
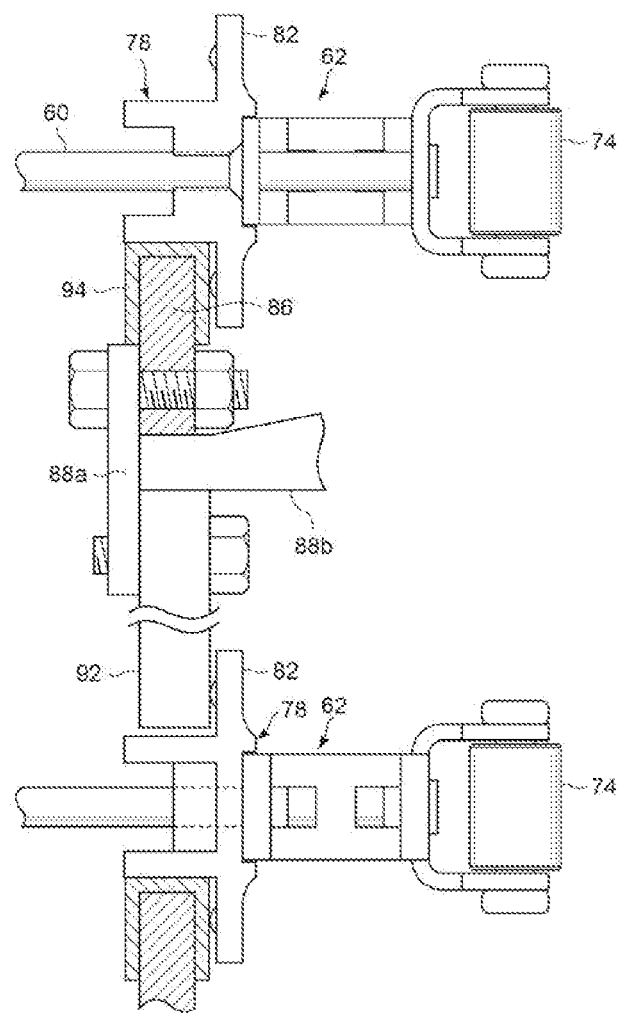
FIG. 6 is a partial enlarged view of FIG. 5.
Figure 7:
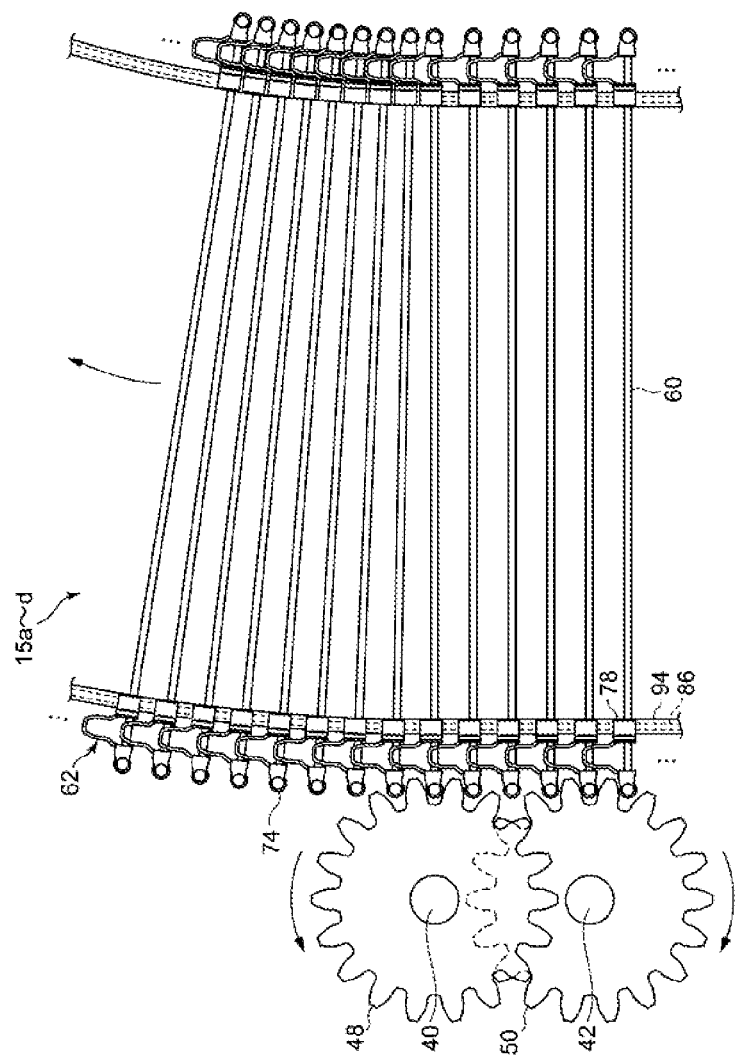
FIG. 7 is a plan view of the conveyance path.
Figure 8:
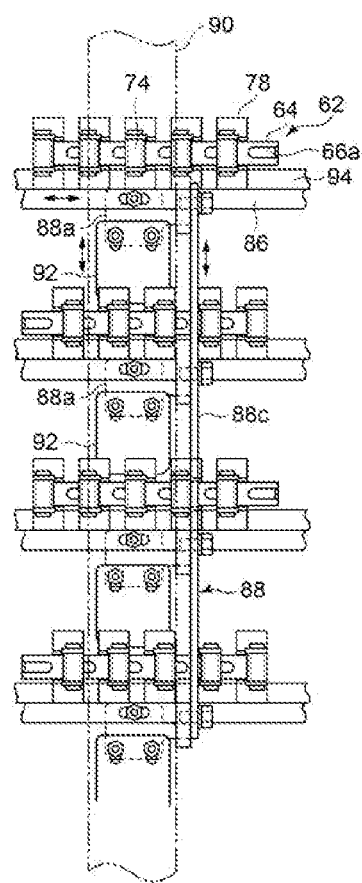
FIG. 8 is a side view of the conveyance path.

As shown in FIG. 6, the coupling members 62 are attached to both ends of each round bar 60. The round bars 60 are coupled to each other through the coupling members 62 to be arranged at a predetermined interval. On the other hand, the coupling members 62 are restricted in series in the conveyance direction via the round bars 60. A slide block 78 is fixed to a portion of the round bar 60 on the inner side of the coupling members 62. The spiral conveyor belts 15a to 15d are each supported by a spiral guide rail 86 disposed below the slide block 78 via the slide block 78, and slide on the guide rail 86.

Figure 9:
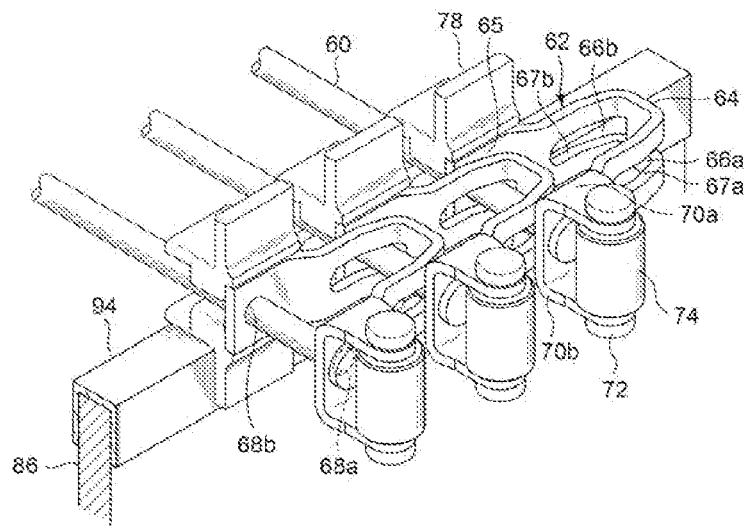
FIG. 9 is a perspective view showing coupling members of the conveyor device.

FIG. 9 is an enlarged view of the coupling members 62. The coupling members 62 is formed by bending a plate material, made of stainless steel, into a U shape. A pair of slotted holes 66a and 66b are formed at positions facing each other between both end portions 65 and a top portion 64. A pair of round holes 68a and 68b facing both end portions 65 are formed. An end portion of the round bar 60 is tightly fitted in the round holes 68a and 68b.

An upper bracket 70a and a lower bracket 70b are integrally formed with one of both end portions 65 positioned on the outer side of the round bar 60. The upper and lower brackets 70a and 70b are positioned on upper and lower sides of the conveyor belt formed of the round bars 60, in the height direction of the conveyor belt, and are bent towards the outer side of the conveyor belt formed of the round bars 60. A shaft 72 is attached to the upper and lower brackets 70a and 70b. The rollers 74 made of the wear resistant resin are rotatably attached to the shaft 72. The shaft 72 is disposed in a direction orthogonal to the conveyance surface of spiral conveyor paths 14a to 14d.

The round bar 60, adjacent to another round bar 60 tightly fitted in the round holes 68a and 68b, is inserted in the slotted holes 66a and 66b. Long sides 67a and 67b of the slotted holes 66a and 66b are disposed in the conveyance direction of the conveyor belt, and thus the round bars 60 are loosely fitted in the slotted holes 66a and 66b to be movable in the conveyance direction. Thus, an interval between the two adjacent round bars, restricted with a single coupling member 62, in the conveyance direction can be changed.

Figure 10:
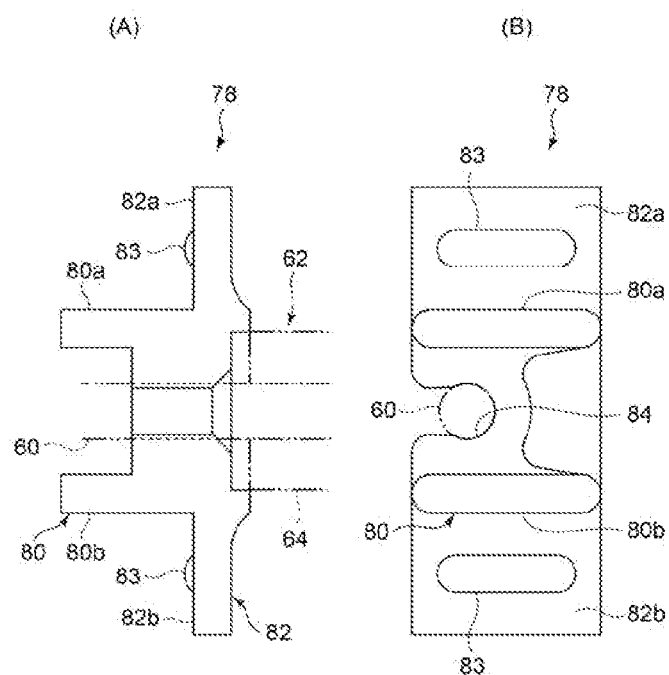
FIG. 10 is a diagram showing a slide block of the conveyor device in which, (A) is a front view thereof and (B) is a side view thereof.

Next, a configuration of the slide block 78 will be described with reference to FIG. 10. The slide block 78 is made of the above-described wear resistant resin, and includes: a slide portion 80 including slide surfaces 80a and 80b which are disposed on upper and lower sides of a semicircular recessed groove 84, in which the corresponding round bar 60 is tightly fitted, and slide on the upper edge surface of the guide rail 86; and a guide portion 82 which is disposed on both sides of a fitted portion for the round bar 60 and protrudes in the vertical directions from the slide surfaces 80a and 80b. Guide surfaces 82a and 82b, guided by side surfaces of the later-described guide rail 86, are formed on inner side surfaces of the guide portion 82. A protrusion 83 which has an arc shaped cross section and reduces friction on the guide rail 86 is formed on each of the guide surfaces 82a and 82b.

The slide portion 80 has rectangular parallelepiped shape. The guide portion 82 has a rectangular plate shape protruding upward and downward from the slide portion 80. The recessed groove 84 having a semicircular cross section is formed at the center of one side surface of the slide block 78. The slide block 78 is fixed to the round bar 60 with the round bar 60 tightly fitted in the recessed groove 84. Thus, the slide portion 80 and the guide portion 82 of the slide block 78 are each vertically symmetrical with respect to the recessed groove 84. The interior areas of the slide portion 80 and the guide portion 82 have small thicknesses to achieve a light weight.

The guide rail 86 is disposed over substantially the entire area of the endless conveyor path 14, except for a certain portion (for example, an area where the tension adjustment mechanism 20 including the guide sprockets 22 and 22 and the tension roller 24 is disposed). The slide surfaces 80*a* and 80*b* of the slide portion 80 form flat surfaces in the horizontal direction. In the endless conveyor path 14, excluding the return path 14F, the slide surface 80*b* is in slidable contact with the guide rail 86 having the flat upper edge surface, and slides on the guide rail 86. In the return path 14F, the endless conveyor path 14 is vertically reversed, and thus the slide surface 80*a* is in slidable contact with the upper edge surface of the guide rail 86.

The guide rail 86 has a spiral shape in the spiral ascending path 14B and the spiral descending path 14D. The guide surfaces 82*a* and 82*b* of the guide portion 82 are in slidable contact with the side surfaces of the guide rail 86, and are guided by the guide rail 86. The guide portion 82 guides the guide rail 86, and prevent the slide surfaces 80*a* and 80*b* from falling off from the guide rail 86.

Figure 5:
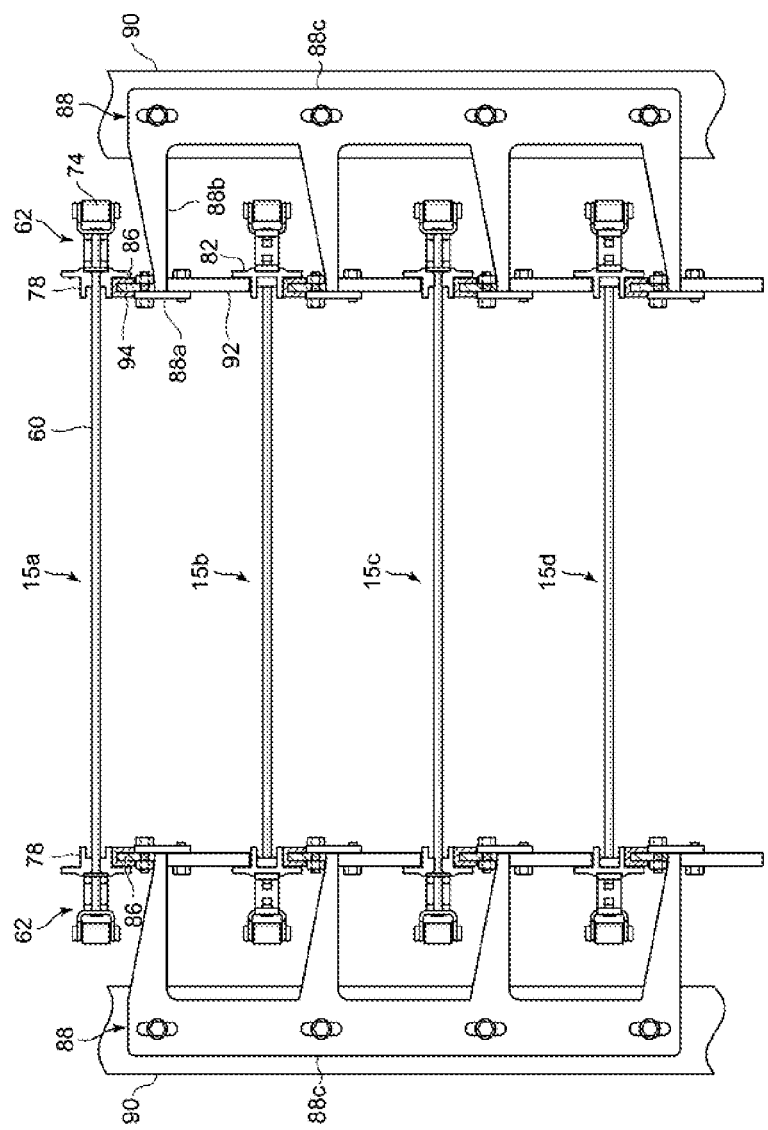
FIG. 5 is a lateral cross-sectional view showing a part of a conveyance path of the conveyor device.

As shown in FIG. 5 and FIG. 6, the guide rail 86 is made of metal such as stainless steel and is disposed below the slide block 78 between the conveyance paths. The spiral conveyor belt 15*a* to 15*d* are supported by the guide rail 86 in such a manner as to be movable in the conveyance direction. The guide rail 86 is fixed to supporting structures 88 disposed on both sides of the spiral conveyor belt 15*a* to 15*d*. Each of the supporting structures 88 is made of metal such as stainless steel, and includes: a support plate 88*a* bolted to the guide rail 86; four arms 88*b* which is integrally formed with the support plate 88*a* and extends in a direction orthogonal to the support plate 88*a*; and a base portion 88*c* in which the arms 88*b* are integrally formed and disposed at an equal interval in the vertical direction.

Columns 90 stand on both sides of the spiral conveyor belt 15*a* to 15*d* while being apart from each other by an appropriate interval. The base portion 88*c* of the supporting structure 88 is bolted to the corresponding column 90. An anti-drop plate 92 is bolted to a lower portion of the support plate 88*a*. The anti-drop plate 92 is partially disposed in the conveyance direction instead of being disposed entirely, whereby flow of cold air between an upper space of the conveyor belt and an exterior space thereof is ensured. The anti-drop plate 92 is disposed on the inner side of the guide portion 82, and prevents the food on the conveyance path from falling off the conveyance surface.

The guide rail 86 and the support plate 88*a*, the base portion 88*c* and the columns 90, and the support plate 88*a* and the anti-drop plate 92 are bolted to each other through the slotted holes. Thus, the relative positions therebetween can be slightly adjusted in the horizontal direction or the vertical direction. The upper edge of the guide rail 86 in slidable contact with the slide portion 80 of the slide block 78 is covered with an U-shaped cover 94 made of the above-described wear resistant resin.

Figure 11:
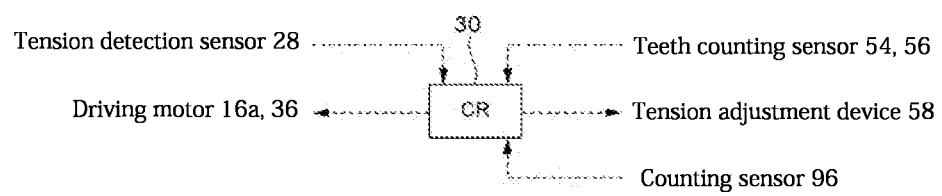
FIG. 11 is a block line diagram showing a control system for the conveyor device.

As shown in FIG. 1, a counting sensor 96 which measures the number of slide blocks 78 passing through is disposed on a lower side of the inlet path 14A. FIG. 11 illustrates a control system for the spiral endless conveyor device 12. Detection values from the tension detection sensor 28, the teeth counting sensors 54 and 56, and the counting sensor 96 are input to the control device 30. The control device 30 controls operations of the drive motor 16*a*, the drive motor 36, the tension adjustment devices 58, and the like based on these detection values.

In this configuration, an extremely low temperature atmosphere at −35° C. or the like for example is maintained in the freezer 10. In the spiral endless conveyor device 12, the food is placed on the conveyor belt in the inlet path 14A and is frozen while being conveyed in the extremely low temperature atmosphere. The round bars 60 are either tightly fitted in the round holes 68*a* and 68*b* of one of the adjacent coupling members 62 or loosely fitted in the slotted holes 66*a* and 66*b* of the other one of the adjacent coupling members 62. Thus, the round bars are arranged in parallel to form the conveyance path, while having the interval therebetween restricted with the coupling members 62. On the other hand, the coupling members are coupled to each other in series in the conveyance direction by the round bars 60. The round bar 60 inserted in the slotted holes 66*a* and 66*b* can move in the conveyance direction, whereby the interval between the round bars 60 can be adjusted.

The detection value from the tension detection sensor 28 is input to the control device 30. Thus, the control device 30 controls operations of the driving device 16*a* and the tension adjustment devices 58 in such a manner that the tension of the conveyor belt forming the endless conveyor path 14 is prevented from being an abnormal value. The detection values from the teeth counting sensors 54 and 56 and the counting sensor 96 are input to the control device 30. Thus, the control device 30 monitors a moving state of the endless conveyor path 14.

In the present embodiment, the shaft 72 of each roller 74 is disposed in the direction orthogonal to the conveyance surface of the spiral conveyor belts 15*a* to 15*d*, and thus can rotate in the rotation direction of the sprockets 48 and 50, whereby slipping between the rollers 74 and the sprockets 48 and 50 can be reduced. The sprockets 48 and 50 and the rollers 74 are made of the wear resistant resin, and thus the members can be prevented from wearing. All things considered, the metal powder and the like are not produced as in the conventional case, whereby a favorable hygienic environment for the conveyed food can be maintained. The slide block 78 is made of the wear resistant resin, and the cover 94 made of the wear resistant resin is provided at the upper edge of the guide rail 86. Thus, the powder dust can be prevented from being produced on the slide surface between the slide block 78 and the guide rail 86.

The slide block 78 includes the slide portion 80 and the guide portion 82 only. The slide portion 80 slides on the guide rail 86. Thus, the slide block 78 does not surround the guide rail 86, as in the case of the supported portion in Patent Document 3. Thus, the slackening of the conveyor belt can be easily fixed, and the contact pressure and the friction force between the slide block 78 and the guide rail 86 do not increase in the low temperature environment. Thus, the driving torque of the conveyance mechanism 32 can be prevented from increasing, and abrasion powder can be prevented from being produced on the slide surface on the guide rail 86. All things considered, the quality of the food on the conveyor belt can be prevented from being adversely affected.

When the contact pressure and the friction force between the slide block 78 and the guide rail 86 increase, knocking phenomenon involving unstable conveyance speed due to periodical change of the contact pressure and the friction force occurs. Thus, the smooth movement of the conveyor belt is hindered. In the present embodiment, the contact pressure and the friction force between the slide block 78 and the guide rail 86 can be reduced, whereby the knocking phenomenon can be prevented from occurring.

The slide portion 80 of the slide block 78 includes the slide surfaces 80a and 80b in slidable contact with the guide rail 86, on the upper and lower sides of the round bar 60. The guide portion 82 includes the guide surfaces 82a and 82b guided by the guide rail 86 on the upper and lower sides. Thus, the conveyor belt can be effectively prevented from falling off from the guide rail 86. In the return path 14F, the endless conveyor path 14 can be supported by the guide rail 86, and the endless conveyor path 14 can smoothly move. These can be achieved by a single guide portion 82, whereby the supporting mechanism for the conveyor belt can be simplified. The protrusions 83 formed on the guide surfaces 82a and 82b can reduce the friction on the guide rail 86, and thus the driving force of the drive motor 36 of the conveyance mechanism 32 can be reduced.

The slide block 78 is provided for each round bar 60, whereby the adjacent round bars are free of restriction. Thus, an intricate arc can be formed at the curved portion of the endless conveyor path 14, and thus higher design freedom of the endless conveyor path 14 can be achieved. Furthermore, the slide block 78 can have a simple shape, and can be manufactured at a low cost.

The tension detection sensor 28 constantly monitors the tension applied to the endless conveyor path 14, and the control device 30 operates the drive motor 16a of the guide sprocket 16, whereby the tension can be adjusted. As described above, the slackening of the endless conveyor path 14 can be adjusted, and thus excessively high tension can be prevented from being applied to the endless conveyor path 14. The teeth counting sensors 54 and 56 and the counting sensor 96 can constantly monitor the moving state of the endless conveyor path 14, whereby abnormality of the spiral endless conveyor device 12 can be quickly detected.

The conveyance mechanism 32 can apply conveyance force evenly on the spiral ascending path 14B and the spiral descending path 14D with the plurality of sprockets 48 and 50 fixed to the rotational axes 40 and 42. Thus, the endless conveyor path 14 can uniformly move, whereby the slackening can be prevented from occurring. A single drive motor 36 is the only driving device required, whereby the simple and low cost configuration can be achieved.

The anti-drop plate 92 can prevent the food on the conveyance surface from falling off the conveyance path. The guide rail 86 is fixed by the columns 90 standing on both sides of the conveyance path while being apart from each other by an appropriate distance, and the supporting structures 88. Thus, the guide rail 86 can be fixed by a simple and low cost supporting structure, even when the conveyor belt has multiple stages in the vertical direction.

As shown in FIG. 4, the drive motor 36, the decelerator 38, the thrust bearings 44 and 46, the spur gears 51 and 52, and the teeth counting sensors 54 and 56 are disposed in the normal temperature area on the outer side of the ceiling wall 10d, and thus can be maintained and repaired easily.

The spiral ascending path 14B and the spiral descending path 14D are disposed so that stages of the spiral ascending path 14B and staged of the spiral descending path 14D are arranged alternately. Thus, space saving can be achieved in the freezer 10. The inlet path 14A and the outlet path 14E are disposed at lower portions. Thus, the food can be easily put in and taken out, whereby labor saving and higher efficiency can be achieved.

Embodiment 2

Figure 12:
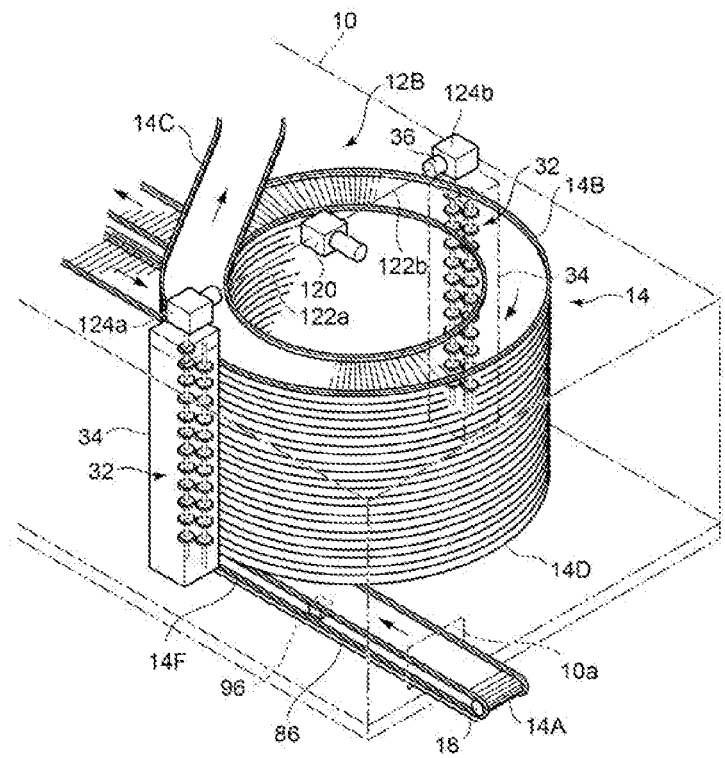
FIG. 12 is a perspective view of an entire conveyor device according to a second embodiment of the present invention.

Next, a conveyor device according to a second embodiment of the present invention will be described with reference to FIG. 12. A conveyor device 12B according to the present embodiment represents an example of a case where a load of the conveyance mechanism 32 is large. In the present embodiment, a drive motor 120 is disposed at the center of an upper edge portion of the spiral conveyance path including the spiral ascending path 14B and the spiral descending path 14D. The drive motor 120 has a larger capacity than the drive motor 36 according to the first embodiment. Two housings 34 are disposed at positions on opposite sides of the spiral conveyance path, and each housing 34 incorporates the conveyance mechanism 32 having the configuration that is the same as that in the first embodiment.

Gearboxes 124a and 124b which drive the rotational axes 40 and 42 are disposed on top walls of the housings 34. Driving shafts 122a and 122b extend from the drive motor 120 to be connected to the gearboxes 124a and 124b. Other configurations are the same as the counterparts in the first embodiment.

In the present embodiment, the driving force from the drive motor 120 is transmitted to the rotational axes 40 and 42 in the conveyance mechanisms 32 through the gearboxes 124a and 124b. In the present embodiment, even when the load of the conveyance mechanism 32 is large, the two conveyance mechanisms 32 can be driven by a single drive motor 120. The conveyance force is shared by the two conveyance mechanisms 32 on both sides of the spiral conveyance path, whereby the smooth movement of the spiral conveyance path can be achieved.

Embodiment 3

Figure 13:
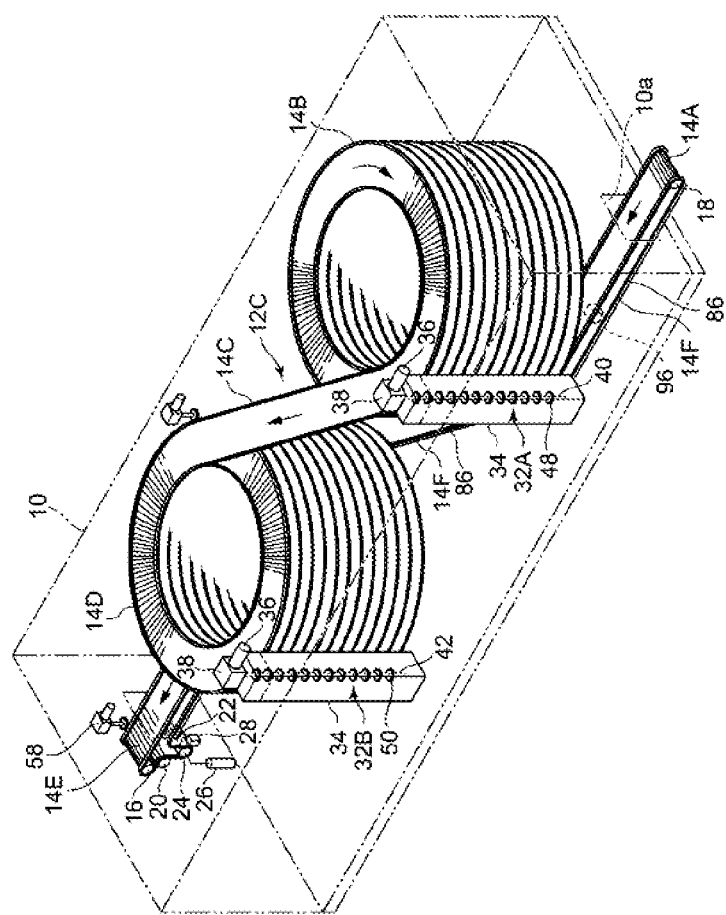
FIG. 13 is a perspective view of an entire conveyor device according to a third embodiment of the present invention.
Figure 14:
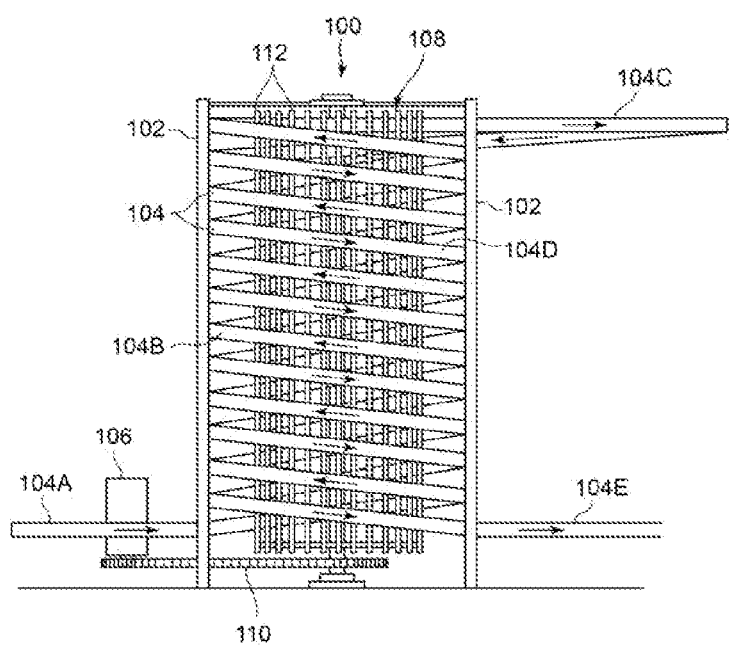
FIG. 14 is a front view of an entire a conventional spiral endless conveyor device.

Next, a third embodiment of the present invention will be described with reference to FIG. 13. In a conveyor device 12C according to the present embodiment, two spiral conveyance paths each including corresponding to one of the spiral ascending path 14B and the spiral descending path 14D are adjacently disposed in the freezer 10. The housing 34 is provided to each of the two spiral conveyance paths. A conveyance mechanism 32A is disposed in one of the housings 34, and a conveyance mechanism 32B is disposed in the other one of the housings 34. The conveyance mechanism 32A includes only one rotational axis 40 to which the plurality of sprockets 48 according to the first embodiment shown in FIG. 4 are attached. The conveyance mechanism 32B includes only one rotational axis 42 to which the plurality of sprockets 50 according to the first embodiment shown in FIG. 4 are attached.

Teeth counting sensors having the configurations that are the same as those of the teeth counting sensors 54, 56 according to the first embodiment shown in FIG. 4 are provided to the conveyance mechanisms 32A and 32B, and detect rotation amounts of the rotational axes 40 and 42. Furthermore, a control device similar to the control device 30 shown in FIG. 11 is provided. The control device has a function of synchronizing the rotation speeds of the rotational axes 40 and 42 to synchronize the movement speeds of the conveyor belt forming the spiral ascending path 14B and the conveyor belt forming the spiral descending path 14D by receiving detection values from the teeth counting sensors provided to the conveyance mechanisms 32A and 32B. The other configurations are the same as the counterparts in the first embodiment.

According to the present embodiment, the spiral ascending path 14B and the spiral descending path 14D are separated from each other, and thus the spiral conveyance path having a simpler and lower cost configuration, compared with the second embodiment, can be achieved. The conveyance mechanisms 32A and 32B are different from the conveyance mechanism 32 according to the first embodiment in that only one rotational axis is provided and can each be configured for a spiral conveyance path moving in a single direction. Thus, a simple and low cost configuration can be achieved. The movement speeds of the conveyor belt forming the spiral ascending path 14B and the conveyor belt forming the spiral descending path 14D are synchronized. Thus, the conveyor belt forming the endless conveyor path 14 can be prevented from slackening and can move smoothly.

All the embodiments described above are applied to freezing processing for food. However, the present invention is not limited to the freezing processing for food, and can be applied to other food processing such as heating and drying processing for example.

INDUSTRIAL APPLICABILITY

With the present invention, a simple and low cost conveyor device for conveying food can be implemented in which metal powder can be prevented from being generated and contact pressure and friction between the guide rail and the slide portion can be prevented from increasing in a low temperature environment.

The invention claimed is:

1. A conveyor device for conveying food which processes food while conveying the food with a spiral conveyor belt disposed in a vertical direction in a closed space, the conveyor device comprising:
   a large number of bar members which are arranged in parallel to form the conveyor belt;
   coupling members which are fixed to both ends of each of the bar members and couple the bar members with each other;
   a guide rail which slidably supports the conveyor belt including the bar members;
   a sprocket which meshes with tooth-shaped portions formed on the coupling members;
   a slide block fixed to a portion of each bar member at an inner side of one of the coupling members and configured to slide on the guide rail disposed along the conveyor belt; and
   rollers which form the tooth-shaped portions and mesh with the sprocket, the rollers being rotatably supported by shafts disposed on the coupling members in a direction intersecting with a conveyance surface of the conveyor belt, wherein
   the rollers each include a wear resistant resin member, and a meshing portion of the sprocket which meshes with the rollers includes a wear resistant resin member.

2. The conveyor device for conveying food according to claim 1, wherein each coupling member has a bent shape with an interior space, has both end portions coupled to a first bar member, and has a pair of slotted holes in which a second bar member which is adjacent to the first bar member is loosely fitted.

3. The conveyor device for conveying food according to claim 1, wherein
   each slide block includes:
      a slide surface which is in slidable contact with the guide rail; and
      a guide portion which protrudes towards the guide rail from the slide surface and has a guide surface guided by a side surface of the guide rail, and
   the guide rail supports the spiral conveyor belt from below via the slide surfaces of the slide blocks, and guides the spiral conveyor belt via the guide portions of the slide blocks.

4. The conveyor device for conveying food according to claim 3, wherein
   the slide surfaces and the guide surfaces of the slide blocks are each formed of a wear resistant resin,
   an upper edge of the guide rail is covered with a cover made of a wear resistant resin, and
   the cover made of the wear resistant resin is in slidable contact with the slide surfaces and the guide surfaces of the slide blocks.

5. The conveyor device for conveying food according to claim 3, wherein
   the slide surface of each slide block includes a pair of slide surfaces which are disposed to be vertically symmetrical with respect to the bar members, and
   the guide surface of each guide portion includes a pair of guide surfaces which are disposed to be vertically symmetrical with respect to the bar members.

6. The conveyor device for conveying food according to claim 1, wherein
   the spiral conveyor belt includes an endless conveyor belt including a return path in which the spiral conveyor belt is reversed at a terminating end of the spiral conveyor belt to return to a starting end of the spiral conveyor belt,
   the guide rail is disposed over an entire length of the endless conveyor belt, and
   the conveyor device includes:
      a tension adjustment mechanism which is disposed in a path of the endless conveyor belt and adjusts tension of the endless conveyor belt; and
      a conveyance mechanism including the sprocket and a driving device for the sprocket.

7. The conveyor device for conveying food according to claim 6, wherein
   the endless conveyor belt includes:
      an inlet path which is disposed in a horizontal direction;
      a spiral ascending path which has a lower end portion coupled to the inlet path and spirally ascends towards a downstream side in a conveyance direction;
      a turning back path turning back from an upper most portion of the spiral ascending path;
      a spiral descending path coupled to the turning back path and disposed so that stages of the spiral ascending path and stages of the spiral descending path are arranged alternately, the spiral descending path spirally descending;
      an outlet path which is coupled to a lower most portion of the spiral descending path and is disposed in the horizontal direction; and
      the return path which turns back at an end of the outlet path toward a lower part of the outlet path and continues to an end of the inlet path.

8. The conveyor device for conveying food according to claim 6, further comprising a blocking plate which is partially suspended from the guide rail so as to extend in the conveyance direction and disposed on an inner side of the guide portions.

9. The conveyor device for conveying food according to claim 6, further comprising:
  columns which stand on both sides of the spiral conveyor belt; and
  a supporting structure including:
    a plurality of arms each of which is connected to a portion of the guide rail at an identical phase, the plurality of arms being arranged in the vertical direction; and
a base portion which is integrally formed with the plurality of arms and is fixed to each of the columns.

* * * * *